(12) United States Patent
Kharaa et al.

(10) Patent No.: US 11,459,882 B2
(45) Date of Patent: Oct. 4, 2022

(54) SYSTEMS AND METHODS FOR THE DETERMINATION OF LITHOLOGY POROSITY FROM SURFACE DRILLING PARAMETERS

(71) Applicant: Saudi Arabian Oil Company, Dhahran (SA)

(72) Inventors: Hamad Kharaa, Dammam (SA); Raed Alouhali, Dhahran (SA); Arturo Magana-Mora, Dhahran (SA); Mohammed Al-Duhailan, Dhahran (SA); Mohammed Khalid Al-Arfaj, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 203 days.

(21) Appl. No.: 16/825,493

(22) Filed: Mar. 20, 2020

(65) Prior Publication Data
US 2021/0293139 A1    Sep. 23, 2021

(51) Int. Cl.
*E21B 49/00* (2006.01)
*G01V 5/10* (2006.01)
(Continued)

(52) U.S. Cl.
CPC .............. *E21B 49/003* (2013.01); *G01V 5/10* (2013.01); *G01V 5/12* (2013.01); *G06N 20/00* (2019.01);
(Continued)

(58) Field of Classification Search
CPC ........ E21B 49/003; E21B 21/08; E21B 45/00; E21B 47/00; E21B 47/07; E21B 2200/22;
(Continued)

(56) References Cited

U.S. PATENT DOCUMENTS

| 4,794,534 | A | 12/1988 | Millheim |
| 7,177,765 | B1 * | 2/2007 | Berge ..................... G01V 1/306 702/16 |

(Continued)

FOREIGN PATENT DOCUMENTS

| CN | 104453875 A | 3/2015 |
| CN | 109557253 A * | 4/2019 |

(Continued)

OTHER PUBLICATIONS

M. Sidahmed and et al, "Streamline Rock Facies Classification with Deep Learning Cognitive Process", SPE Annual Technical Conference and Exhibition held in San Antonio, Texas, USA, Oct. 9-11, 2017 (Year: 2017).*

(Continued)

*Primary Examiner* — Douglas Kay
(74) *Attorney, Agent, or Firm* — Bracewell LLP; Constance G. Rhebergen; Brian H. Tompkins

(57) ABSTRACT

Systems, processes, and computer-readable media for determining lithology porosity of a formation rock from surface drilling parameters using a lithology porosity machine learning model without the use of wireline logging. Lithology porosity at different depths in existing may be determined from the wireline logs. The lithology porosity may be shaly sand, tight sand, porous gas, or porous wet. The lithology porosity machine-learning model may be trained and calibrated using the data from a structured data set having surface drilling parameters from the existing wells and lithology porosity classifications from the wells. The lithology porosity machine learning model may then be used to determine a lithology porosity classification for a new well without the use of wireline logging.

19 Claims, 5 Drawing Sheets

(51) Int. Cl.
  *G01V 5/12* (2006.01)
  *E21B 47/07* (2012.01)
  *E21B 21/08* (2006.01)
  *E21B 45/00* (2006.01)
  *G06N 20/00* (2019.01)

(52) U.S. Cl.
  CPC .............. *E21B 21/08* (2013.01); *E21B 45/00* (2013.01); *E21B 47/07* (2020.05)

(58) Field of Classification Search
  CPC . E21B 49/00; G01V 5/10; G01V 5/12; G01V 2210/1299; G01V 2210/1429; G01V 2210/6167; G01V 2210/6169; G01V 2210/6244; G01V 1/50; G01V 11/00; G06N 20/00
  See application file for complete search history.

(56) References Cited

U.S. PATENT DOCUMENTS

| | | | |
|---|---|---|---|
| 9,482,084 | B2 | 11/2016 | Chang et al. |
| 9,828,845 | B2 | 11/2017 | Kpetehoto et al. |
| 9,903,974 | B2 | 2/2018 | Yang |
| 9,970,266 | B2 | 5/2018 | Marx et al. |
| 10,209,399 | B2 | 2/2019 | Rojas et al. |
| 10,233,728 | B2 | 3/2019 | Kristjansson et al. |
| 10,242,312 | B2 | 3/2019 | Storm, Jr. |
| 2003/0222651 | A1* | 12/2003 | Tabanou .............. G01V 11/002 324/324 |
| 2008/0294606 | A1 | 11/2008 | Moran et al. |
| 2014/0025301 | A1* | 1/2014 | Storm, Jr. ............... E21B 47/00 702/6 |
| 2015/0356403 | A1 | 12/2015 | Storm, Jr. |
| 2017/0037721 | A1 | 2/2017 | Lovorn et al. |
| 2018/0320485 | A1* | 11/2018 | Fei ........................ E21B 41/00 |
| 2019/0169986 | A1* | 6/2019 | Storm, Jr. ................ G01V 1/50 |
| 2020/0349467 | A1* | 11/2020 | Teague ................. G06K 9/6231 |

FOREIGN PATENT DOCUMENTS

| | | |
|---|---|---|
| EP | 3523502 A1 | 8/2019 |
| GB | 2434881 A | 8/2007 |
| WO | 2014066981 A1 | 5/2014 |

OTHER PUBLICATIONS

I. M Mohamed and et al, "Formation Lithology Classification: Insights into Machine Learning Methods", SPE Annual Technical Conference and Exhibition held in Calgary, Alberta, Canada, Sep. 30-Oct. 2, 2019 (Year: 2019).*

M. Reynolds and et al, A Laboratory Study of CO2 Interactions Within Shale and Tight Sand Cores—Duvernay, Montney and Wolfcamp Formations, SPE Canada Unconventional Resources Conference held in Calgary, Alberta, Canada, Mar. 13-14, 2018 (Year: 2018).*

Bello, Opeyemi et al.; "Application of Artificial Intelligence Methods in Drilling System Design and Operations: A Review of the State of the Art" JAISCR, vol. 5, No. 2, 2015; pp. 121-139.

Chaki, Soumi; "Reservoir Characterization: A Machine Learning Approach" Department of Electrical Engineering, Indian Institute of Technology, Kharagpur, Apr. 2015; pp. 1-98.

Keynejad, Saba et al.; "Assessment of machine-learning techniques in predicting lithofluid facies logs in hydrocarbon wells" Interpretation, Aug. 2019; pp. SF1-SF13.

International Search Report and Written Opinion for International Application No. PCT/US2021/0123270, report dated Jul. 1, 2021; pp. 1-13.

* cited by examiner

SYSTEMS AND METHODS FOR THE DETERMINATION OF LITHOLOGY POROSITY FROM SURFACE DRILLING PARAMETERS

BACKGROUND

Field of the Disclosure

The present disclosure generally relates to the production of hydrocarbons from hydrocarbon reservoirs in rock formations. More specifically, embodiments of the disclosure relate to determining the lithology porosity of reservoir rock in such formations.

Description of the Related Art

An understanding of the subsurface material within a hydrocarbon reservoir is important in development of the hydrocarbon reservoir for the production of hydrocarbons such as oil and gas. Various technique existing for measuring and characterizing the subsurface material, such as reservoir rock, within a hydrocarbon reservoir. For example, wireline logging (including sonic, neutron porosity, density, and other logs) may be used for the characterization of geophysical data performed as a function of wellbore depth. However, wireline logging may be a lengthy and costly process as it requires by lowering a logging device on the end of a wireline into a borehole of a well drilled into a formation. Moreover, other existing techniques may be similarly time consuming and expensive and require multiple insertions into a well or multiple wells.

SUMMARY

The accurate characterization of the lithology porosity of rock in a formation is important for geological interpretation and decision-making in hydrocarbon exploration. Such characterization may typically be obtained using wireline logging. A common practice in the oil and gas industry is to perform wireline logging for every new well. However, this practice is time-consuming and expensive, and adds to the overall development time and cost for hydrocarbon production.

In one embodiment, a method for determining the lithology porosity of formation rock in a well is provided. The method includes obtaining a plurality of surface drilling parameters for a respective plurality of first wells, the plurality of surface drilling parameters including drill bit size, the flow rate of a drilling fluid, methane concentration in a drilling fluid, ethane concentration in the drilling fluid, total gas concentration in the drilling fluid, weight of the drilling fluid flowing into the well, weight of the drilling fluid flowing out of the well, rate of penetration of the drill bit, rotation speed of the drill bit, the torque between the drill string and a formation, weight on bit (WOB), temperature of the drilling fluid flowing into the well, and temperature of the drilling fluid flowing out of the well. The method further includes obtaining a respective plurality of wireline logs for the plurality of first wells and determining respective lithology porosity classifications for the plurality of first wells based on the wireline logs to produce a structured data set that includes the plurality of surface drilling parameters, the plurality of drilling fluid parameters, and the lithology porosity classifications, the lithology porosity classifications including a lithology porosity at one or more depths for each of the plurality of first wells. The method also includes generating a lithology porosity machine learning model using the structured data set, obtaining a second plurality of surface drilling parameters from a second well, and determining, using the second plurality of surface drilling parameters and the lithology porosity machine learning model, a lithology porosity classification for the second well, the lithology porosity classification for the second well having a lithology porosity at one or more depths for the second well.

In some embodiments, the lithology porosity is selected from the group consisting of tight sand, shaly sand, porous gas, and porous wet. In some embodiments, the plurality of wireline logs includes at least one of a neutron porosity (NPHI) log, a sonic (DT) log, a density (RHOB) log, and a gamma ray (GR) log. In some embodiments, the method includes normalizing the plurality of surface drilling parameters before generating the lithology porosity machine learning model. In some embodiments, the method includes normalizing the plurality of surface drilling parameters includes using z-score normalization. In some embodiments, the method includes calibrating the lithology porosity machine learning model using a machine learning sigmoid calibration. In some embodiments, the method includes generating a lithology porosity machine learning model using the structured data set includes using nested stratified cross-validation. In some embodiments, the lithology porosity machine learning model is a random forest, an artificial neural network (ANN), a support vector machine (SVM), or long-short term memory networks. In some embodiments, the method includes normalizing the second plurality of surface drilling parameters. In some embodiments, obtaining a respective plurality of wireline logs for the plurality of first wells includes inserting a wireline tool into a respective well and generating a wireline log from measurements obtained using the wireline tool. In some embodiments, the structured data set includes a database, In another embodiment, a system for determining the lithology porosity of formation rock in a well is provided. The system includes a plurality of wireline logs for a respective plurality of first wells and a non-transitory computer-readable medium, the medium having executable code stored thereon. The executable code comprising a set of instructions that causes a processor to perform operations that include obtaining a plurality of surface drilling parameters for a respective plurality of first wells, the plurality of surface drilling parameters including drill bit size, the flow rate of a drilling fluid, methane concentration in a drilling fluid, ethane concentration in the drilling fluid, total gas concentration in the drilling fluid, weight of the drilling fluid flowing into the well, weight of the drilling fluid flowing out of the well, rate of penetration of the drill bit, rotation speed of the drill bit, the torque between the drill string and a formation, weight on bit (WOB), temperature of the drilling fluid flowing into the well, and temperature of the drilling fluid flowing out of the well. The operations further include determining respective lithology porosity classifications for the plurality of first wells based on the wireline logs to produce a structured data set that includes the plurality of surface drilling parameters, the plurality of drilling fluid parameters, and the lithology porosity classifications, the lithology porosity classifications including a lithology porosity at one or more depths for each of the plurality of first wells. The operations also include generating a lithology porosity machine learning model using the structured data set, obtaining a second plurality of surface drilling parameters from a second well, and determining, using the second plurality of surface drilling parameters and the lithology porosity machine learning model, a lithology porosity classification for the second well, the lithology porosity classification for the second well having a lithology porosity at one or more depths for the second well.

In some embodiments, the lithology porosity is selected from the group consisting of tight sand, shaly sand, porous gas, and porous wet. In some embodiments, the plurality of wireline logs includes at least one of a neutron porosity (NPHI) log, a sonic (DT) log, a density (RHOB) log, and a gamma ray (GR) log. In some embodiments, the method includes normalizing the plurality of surface drilling parameters before generating the lithology porosity machine learning model. In some embodiments, the method includes normalizing the plurality of surface drilling parameters includes using z-score normalization. In some embodiments, the method includes calibrating the lithology porosity machine learning model using a machine learning sigmoid calibration. In some embodiments, the method includes generating a lithology porosity machine learning model using the structured data set includes using nested stratified cross-validation. In some embodiments, the lithology porosity machine learning model is a random forest, an artificial neural network (ANN), a support vector machine (SVM), or long-short term memory networks. In some embodiments, the method includes normalizing the second plurality of surface drilling parameters. In some embodiments, the system includes a wireline tool operable to generate the second wireline log. In some embodiments, the structured data set includes a database.

In another embodiment, a transitory computer-readable medium, the medium having executable code stored thereon for determining the lithology porosity of formation rock in a well. The executable code comprising a set of instructions that causes a processor to perform operations that include obtaining a plurality of surface drilling parameters for a respective plurality of first wells, the plurality of surface drilling parameters including drill bit size, the flow rate of a drilling fluid, methane concentration in a drilling fluid, ethane concentration in the drilling fluid, total gas concentration in the drilling fluid, weight of the drilling fluid flowing into the well, weight of the drilling fluid flowing out of the well, rate of penetration of the drill bit, rotation speed of the drill bit, the torque between the drill string and a formation, weight on bit (WOB), temperature of the drilling fluid flowing into the well, and temperature of the drilling fluid flowing out of the well. The operations further include obtaining a respective plurality of wireline logs for the plurality of first wells and determining respective lithology porosity classifications for the plurality of first wells based on the wireline logs to produce a structured data set that includes the plurality of surface drilling parameters, the plurality of drilling fluid parameters, and the lithology porosity classifications, the lithology porosity classifications including a lithology porosity at one or more depths for each of the plurality of first wells. The operations also include generating a lithology porosity machine learning model using the structured data set, obtaining a second plurality of surface drilling parameters from a second well, and determining, using the second plurality of surface drilling parameters and the lithology porosity machine learning model, a lithology porosity classification for the second well, the lithology porosity classification for the second well having a lithology porosity at one or more depths for the second well.

In some embodiments, the lithology porosity is selected from the group consisting of tight sand, shaly sand, porous gas, and porous wet. In some embodiments, the plurality of wireline logs includes at least one of a neutron porosity (NPHI) log, a sonic (DT) log, a density (RHOB) log, and a gamma ray (GR) log. In some embodiments, the method includes normalizing the plurality of surface drilling parameters before generating the lithology porosity machine learning model. In some embodiments, the method includes normalizing the plurality of surface drilling parameters includes using z-score normalization. In some embodiments, the method includes calibrating the lithology porosity machine learning model using a machine learning sigmoid calibration. In some embodiments, the method includes generating a lithology porosity machine learning model using the structured data set includes using nested stratified cross-validation. In some embodiments, the lithology porosity machine learning model is a random forest, an artificial neural network (ANN), a support vector machine (SVM), or long-short term memory networks. In some embodiments, the method includes normalizing the second plurality of surface drilling parameters. In some embodiments, the structured data set includes a database.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to systems, processes, and computer-readable media for determining lithology porosity of formation rock from surface drilling parameters without the use of wireline logging. A structured data set (for example, a database) may be generated from wireline logs from existing wells and may include lithology porosity at different depths in the wells as determined from the wireline logs. In some embodiments, the lithology porosity may be selected from the group consisting of shaly sand (for example sand having shale dispersed throughout), tight sand (for example, low permeability sandstone reservoir that produces dry natural gas), porous gas, and porous wet. The structured data set may also include surface drilling parameters from the wells. A machine-learning model may be trained and calibrating using the data from the structure data set. The lithology porosity machine learning model may then be used to determine a lithology porosity classification for a new well without the use of wireline logging. Surface drilling parameters for the new well may be obtained and provided to the machine-learning model for determination of the lithology porosity for the new well. Advantageously, the determination of the lithology porosity for the new well may be performed in real-time to result in an improvement in decision-making at the wellsite.

Figure 1:
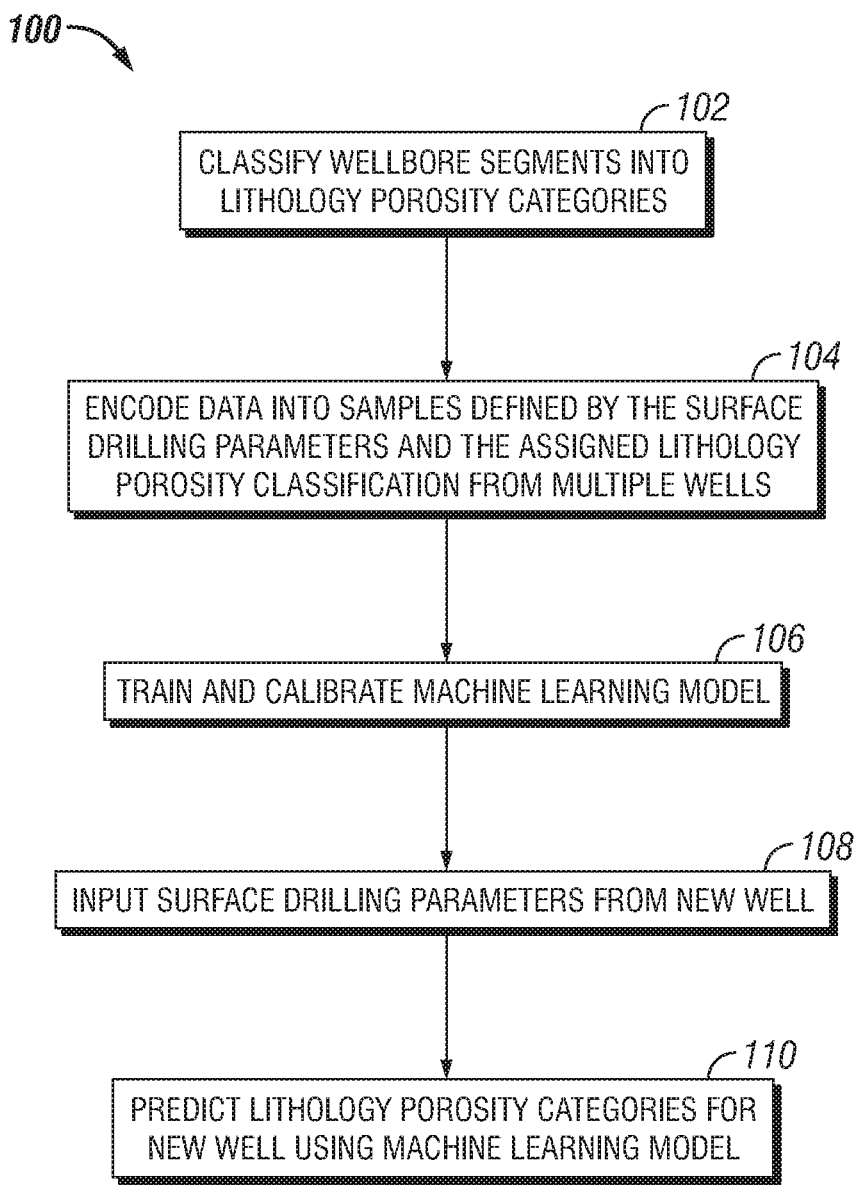
FIG. 1 is a block diagram of a process for predicting lithology porosity from surface drilling parameters in accordance with an embodiment of the disclosure.

FIG. 1 depicts a process 100 for determining lithology porosity from surface drilling parameters in accordance with an embodiment of the disclosure. Initially, wellbore segments (that is, segments at different depths in a well) from one or more wells may be classified into different lithology porosities (block 102) using wireline logs. Wireline logs from the one or more wells may be generated using a wireline tool. The wireline logs may include, for example, a density (RHOB) log, a neutron porosity (NPHI) log, a sonic (DT) log and a gamma ray (GR) log. Surface drilling parameters from each of the one or more wells may be obtained from drilling rig sensors at each well.

Next, data may be encoded into samples defined by the surface drilling parameters and the assigned lithology porosity classification from the one or more wells, and the encoded data may be normalized to account for different ranges of data due to differences in sensors and sensor calibrations (block 104). A lithology porosity machine learning model may be trained and calibrated using the normalized data (block 106). The lithology porosity machine learning model may receive, as inputs, surface drilling parameters and provide, as outputs, a lithology porosity classification using only the surface drilling parameters.

The lithology porosity machine learning model may then be used to determine lithology porosity in a new well without the use of wireline logging, or other measurement techniques such as measurement while drilling (MWD), and logging while drilling (LWD). Surface drilling parameters obtained from a new well may be input to the lithology porosity machine learning model (block 108). A lithology porosity classification for the new well may be determined using the lithology porosity machine learning model (block 110). As will be appreciated, the lithology porosity determination may be performed in real-time as the surface drilling parameters are obtained.

Figure 2:
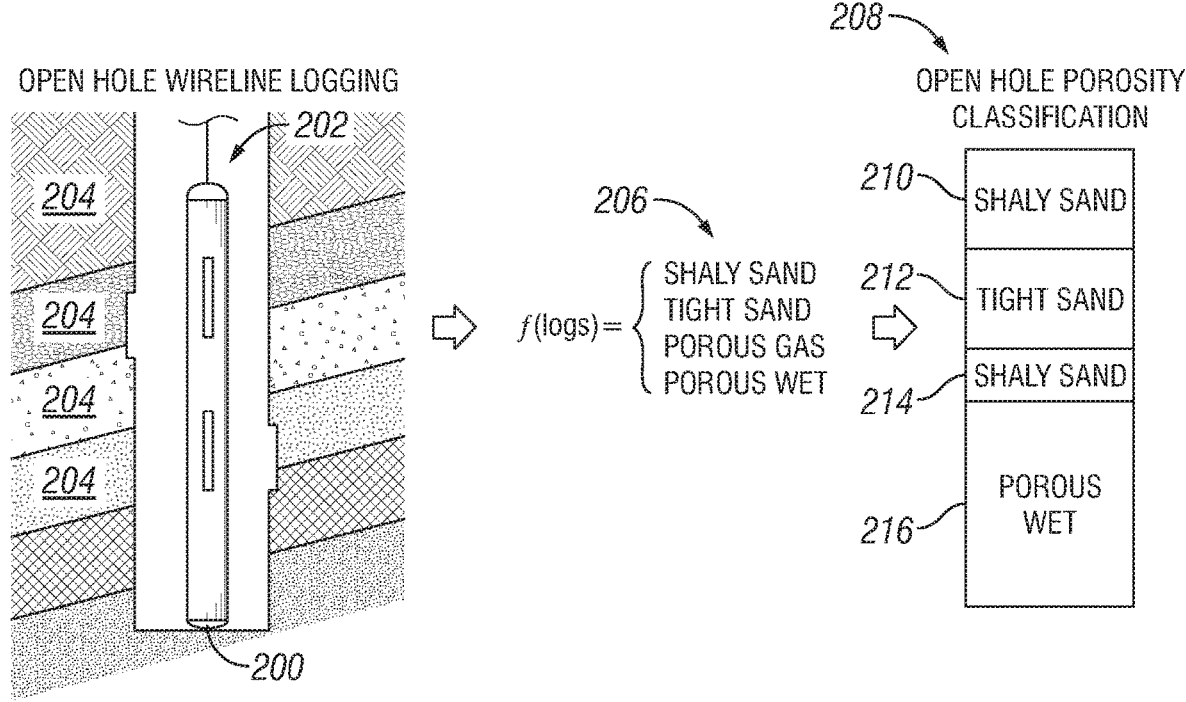
FIG. 2 is a schematic diagram of the determination of categories of lithology porosity for different reservoir segments in accordance with an embodiment of the disclosure.

Initially, wireline logging data from existing wells may be used to determine categories of lithology porosity for different reservoir segments in a wellbore. FIG. 2 is a schematic diagram of the determination of categories of lithology porosity for different reservoir segments in accordance with an embodiment of the disclosure. As shown in FIG. 2, open hole wireline logging may be performed using a wireline logging tool 200 (also referred to as a "wireline tool") inserted into a wellbore 202 accessing various segments 204 of a well in a formation having a hydrocarbon reservoir. The wellbore 202 may be, for example, the wellbore 202 of an exploration well, a crestal well, or other types of wells drilled to access a hydrocarbon reservoir. The wellbore 202 may include any form of a hole formed in a geologic formation, such as for the purpose of locating and extracting hydrocarbons or other resources from a formation. For example, the formation may include an oil and gas reservoir, and the wellbore 202 may include a wellbore drilled into the formation for the purpose of locating and obtaining information about the oil, gas and other hydrocarbons in the reservoir.

In some embodiments, the wireline logging tool 200 may include the capability to measure multiple properties. In some embodiments, the wireline logging tool 200 may produce a density (RHOB) log, a neutron porosity (NPHI) log, a sonic (DT) log, and a gamma ray (GR) log. In such embodiments, the categories of lithology porosity may be determined solely from a density (RHOB) log, a neutron porosity (NPHI) log, a sonic (DT) log, and a gamma ray (GR) log. In other embodiments, the wireline logging tool 200 may produce a deep resistivity (RTD) log and a shallow resistivity (RTS) log.

The wireline logging tool 200 may be suspended on a wireline for insertion into the wellbore 202. The wireline may include a conductor and may enable data transmission between the wireline logging tool 200 and a wireline monitoring and control system. The wireline may be raised and lowered within the wellbore 202 to various depths using devices known in the art, such as a reel and drum apparatus in a service truck having the various components of a wireline system. The wireline monitoring and control system may control operation of the wireline tool in the wellbore 202 and may receive data from wireline logging tool 200 to produce wireline logs. For example, the wireline monitoring and control system may include one or more computer systems or devices.

The wireline logging tool 202 may include modules that enable the measurement of various properties and generation of the well logs. For example, the wireline logging tool 202 may include electromagnetic (resistivity) tools, nuclear tools, acoustic tools, and nuclear magnetic resonance (NMR) tools, and other tools. Such modules may include known components for operation of these modules, such as sensors, antennas, receivers, transmitters, fluid samplers, etc.

Although the embodiment shown in FIG. 2 depicts a wireline logging tool 200, in other embodiments other well logging tools may be used. For example, in some embodiments, similar tools (or tools having similar measurement capabilities) can be incorporated into a logging-while-drilling LWD apparatus. A LWD tool may have components or functionality in common with wireline tools (for example, transmitting and receiving antennas, sensors, etc.), but may be designed and constructed to endure and operate during drilling.

In some embodiments, the categories of lithology porosity (206) may be shaly sand, tight sand, porous gas, and porous wet (such that a resulting lithology porosity classification has 4 classes). An example open hole lithology porosity classification based on these categories is depicted in FIG. 2. As shown in FIG. 2, for example, a reservoir formation may include contiguous segments 208 of shaly sand 210, tight sand 212, porous gas 214, and porous wet 216.

To develop the prediction of lithology porosity from surface drilling parameters, various surface drilling parameters were identified. The surface drilling parameters are shown in Table 1:

TABLE 1

SURFACE DRILLING PARAMETERS

| Parameter | Units |
|---|---|
| Bit size | Inches |
| Mud Flow out | Gallons per minute (gpm) |
| Methane (C1) | Particles per million (ppm) |
| Ethane (C2) | Particles per million (ppm) |
| Total Gas (TGAS) | Particles per million (ppm) |
| Mud in (weight) | Pounds cubic feet (pcf) |
| Mud out (weight) | Pounds cubic feet (pcf) |

TABLE 1-continued

SURFACE DRILLING PARAMETERS

| Parameter | Units |
|---|---|
| Rate of penetration (ROP) | Feet per hour (ft/hr) |
| Revolutions per minute (RPM) | RPM |
| Torque | Kilo-pound-force inch (klbf · in) |
| Weight on bit (WOB) | Kilo-pound-force (klbf) |
| Mud in (temperature) | degrees Fahrenheit (° F.) |
| Mud out (temperature) | degrees Fahrenheit (° F.) |

As used herein, the term "surface drilling parameters" refers to parameters measureable at the surface of the well, including measureable parameters of a drilling fluid. The parameters listed in Table 1 may be defined as: the size of the drill bit (bit size), the flow rate of fluid out of the well (flow out), methane concentration in the drilling fluid (methane (C1)), ethane concentration in the drilling fluid (ethane (C2)), total gas in the drilling fluid (total gas), weight of the mud flowing into the well (mud in (weight)), weight of the mud flowing out of the well (mud out (weight)), the speed of the penetration of the drill bit (rate of penetration), the rotational speed of the drill string and drill bit (revolutions per minute), the torque between the drill string and the formation (torque), the amount of downward force exerted on the drill bit (weight on bit), temperature of the mud flowing into the well (mud in (temperature)), and temperature of the mud flowing out of the well (mud out (temperature)). Embodiments of the disclosure may include measurement of the surface drilling parameters using known sensors and techniques. In some embodiments, mud logging services may be used to collect some of the surface drilling parameters. Bit size may be provided by the bit manufacturer or measured onsite. Flow out may be measured using, for example, paddle flowmeters or drilling mud flowmeters. Methane (C1), ethane (C2), and total gas (TGAS) may be measured using gas traps and gas chromatography. Mud in (weight) and mud out (weight) may be measure manually (for example, by a rig crew using balance), continuously (for example, using a mud logging service), or both. Rate of penetration (ROP), revolutions per minute (RPM), torque, and weight on bit (WOB) may be measured using sensors that are typically built-in sensors of a rig. Mud in (temperature) and mud out (temperature) may be measured using temperature sensors located in an mud active tank (for mud in) and a mud return tank (for mud out).

The identified surface drilling parameters shown in Table 2 were associated with their respective lithology porosity classification. The classification problem was expressed according to Equation 1:

$$S_i = \{x_1, x_2, \ldots, x_n\} : y \quad (1)$$

Where $S_i$ corresponds to the considered drilling surface parameters from Table 1 at a given depth, and $x_i$ represent the parameters listed in Table 1 and is assigned to the porosity classification that represents the label $y \in \{$shaly sand, tight sand, porous gas, porous wet$\}$. Thus, a well with wireline logging data and surface drilling parameters is defined by multiple S samples.

The collection of surface drilling parameters and association with the lithology porosity from wireline logging data may be repeated for multiple wells having logging data available to produce a structured dataset that relates the logging data with different depths and surface drilling parameters.

Figure 3:
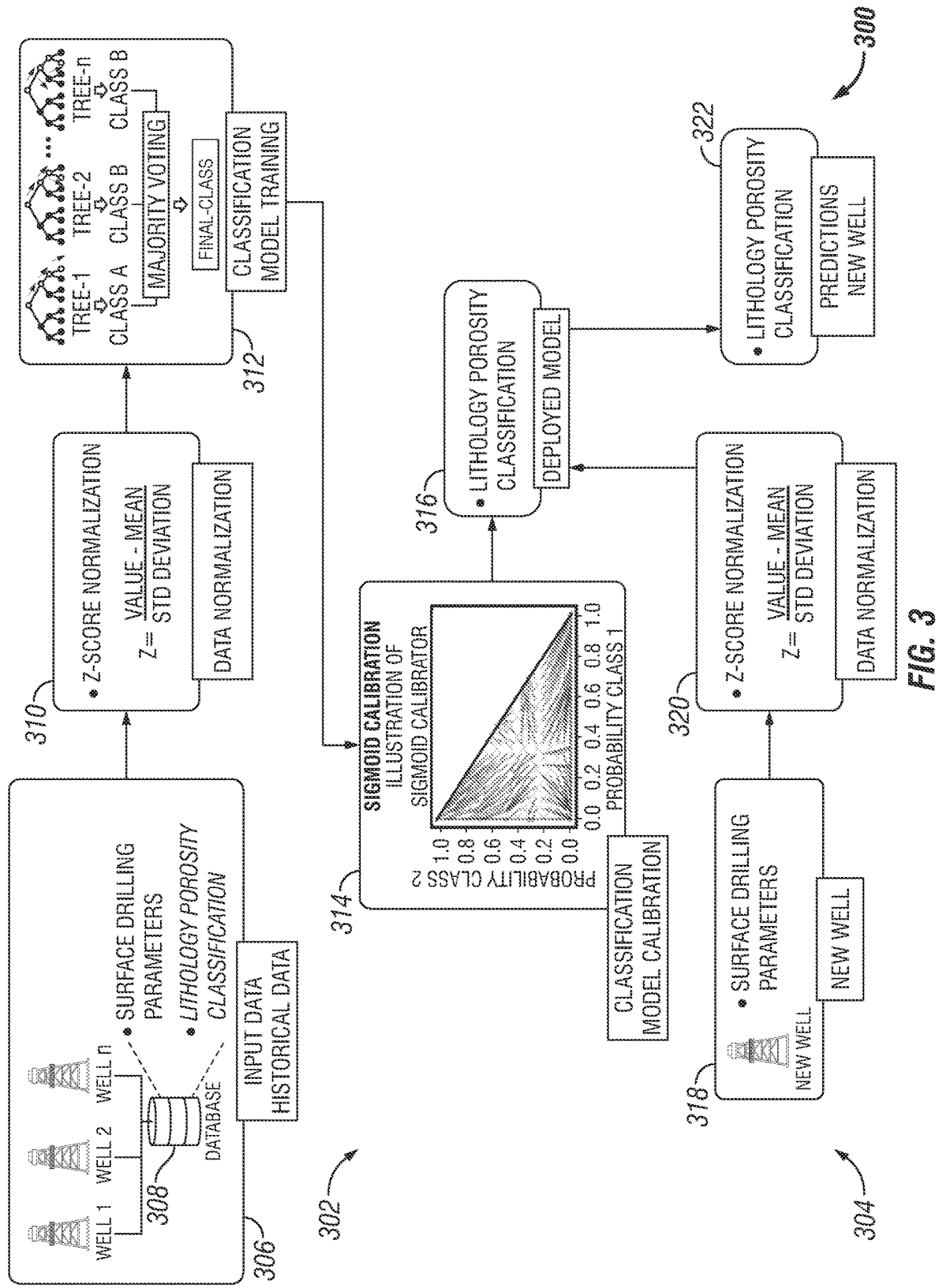
FIG. 3 is a schematic diagram of a process for training and testing a lithology porosity machine learning model for predicting lithology porosity in accordance with an embodiment of the disclosure.

FIG. 3 is a schematic diagram of a process 300 for training (302) and testing (304) a lithology porosity machine learning model for predicting lithology porosity in accordance with an embodiment of the disclosure. As discussed above, data from existing wells (for example, Well 1, Well 2 . . . Well n) may be encoded into samples (Si) defined by surface drilling from wells with logging data (block 306). A structured dataset (for example, a database 308) having the surface drilling parameters and lithology porosity classifications may be generated.

Next, the logging data may be normalized (block 310). In some embodiments, data collected from different well locations and drilling rigs may be collected from sensors having different ranges of data due to differences in sensors and sensor calibrations. The normalization of logging data may normalize these different ranges of data. In some embodiments, the normalization may be a z-score normalization that indicates the signed number of standard deviations by which the value of an observation is above or below the mean.

As shown in FIG. 3, a lithology porosity machine learning model may be trained using the normalized data (block 312). In some embodiments, the lithology porosity machine learning model may implement a random forest algorithm (as shown by the simplified schematic in block 312). In other embodiments, other machine learning or deep learning algorithms for multi-class classification problems may be implemented. For example, in other embodiments, the lithology porosity machine learning model may implement artificial neural networks, support vector machines, or long-short term memory networks, among others.

In some embodiments, the lithology porosity machine learning model is trained and tuned using nested stratified cross-validation. In such embodiments, the nested stratified cross-validation may train and tune model parameters such as number of classifiers, number of features used for each classifier in the ensemble, and other parameters for the random forest. In such embodiments, the inner five-fold cross-validation may be used to tune the parameters of the model using a random search. In some embodiments, the inner five-fold cross-validation may only be performed on the training data while the outer five-fold cross-validation may be used to validate the final performance of the lithology porosity machine learning model.

After the lithology porosity machine learning model is trained and tuned, the lithology porosity machine learning model may be calibrated using a machine leaning sigmoid calibration (block 314). The machine learning sigmoid calibration includes converting the predicted class values by the machine leaning model into probabilities of a sample belonging to each possible class: tight sand, shaly sand, porous gas, and porous wet. The calibration of the machine leaning model may provide for more flexibility when interpreting the predicted results while reducing the overly confident classifiers that may incur a large log-loss or lack of generalization for unseen conditions (for example, new wells).

The trained and calibrated machine learning model may be deployed for use in lithology porosity classification (block 316). Advantageously, the lithology porosity machine learning model may be used in real-time at wellsite. Furthermore, the training and calibration of the machine-learning model using surface drilling parameter and a lithology porosity classification having four categories enables faster and easier training and calibration of the model by transforming the problem from a regression into a 4-class classification.

In some embodiments, the lithology porosity machine learning model may be tested after the machine model is deployed. In such embodiments, logging data from a new well may be used to test the lithology porosity machine learning model. Surface drilling parameters from a new well may be obtained (block 318). The surface drilling parameters data may be normalized (block 320). In some embodiments, the normalization may be a z-score normalization, as discussed above. The normalized samples from the new well may then be input to the deployed machine learning model, which outputs a lithology porosity classification (block 322) for the new well. As will be appreciated, no wireline or other logging data is required for the determination of a lithology porosity classification for the new well.

Figure 4:
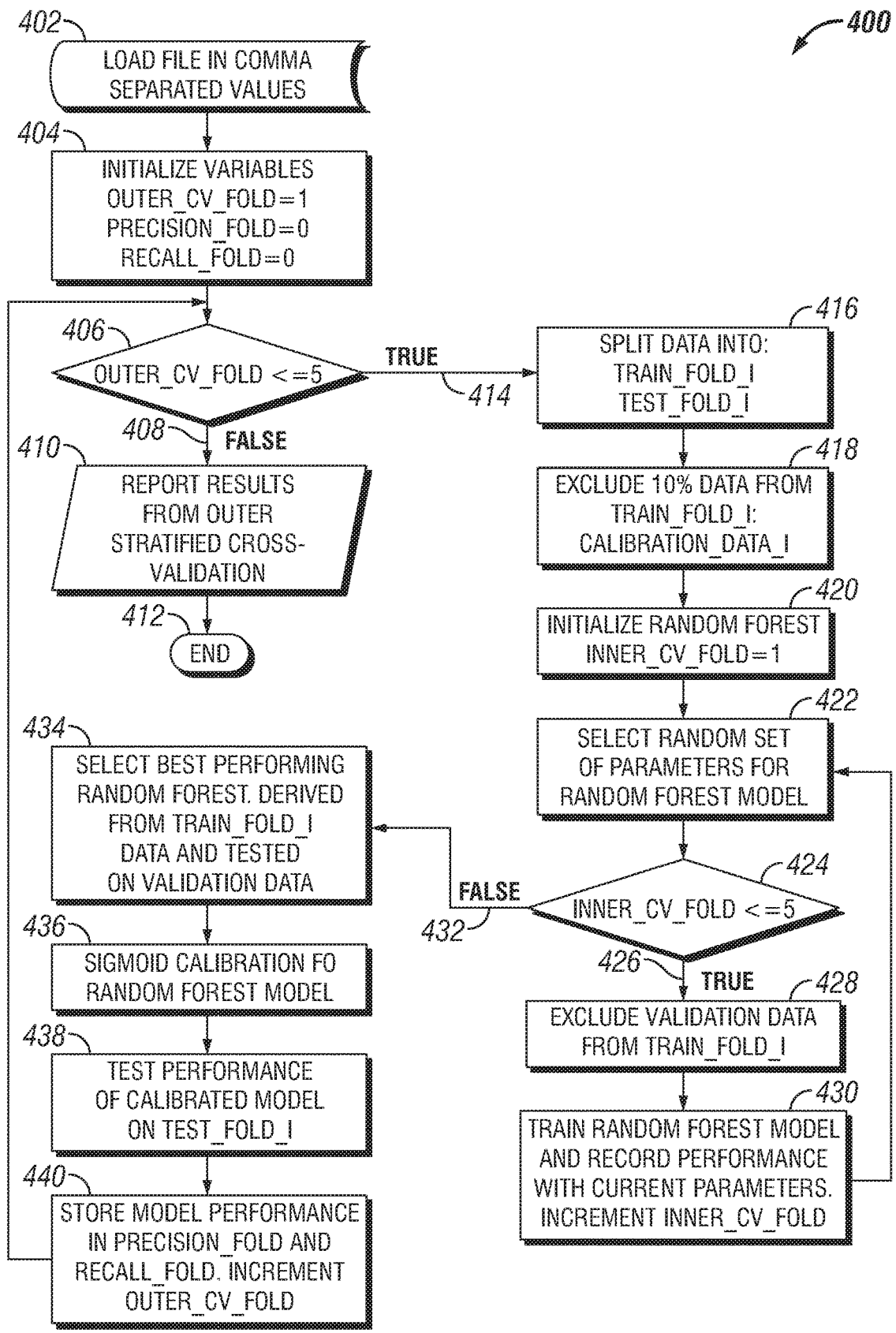
FIG. 4 is a logic flowchart for the training, tuning, and calibration of the lithology porosity machine learning model using an inner five-fold cross-validation (CV) and outer five-fold cross-validation (CV) in accordance with the present disclosure.

FIG. 4 depicts a logic flowchart 400 for the training, tuning, and calibration of the lithology porosity machine learning model using an inner five-fold cross-validation (CV) and outer five-fold cross-validation (CV) in accordance with the present disclosure. Initially, a file having comma separated values for the input data (that is, the normalized data) may be loaded (block 402). Next, variables may be initialized (block 404), such as by being set to initial values. In one particular embodiment, the variable outer_CV_fold may be set to 1, the variable precision_fold may be set to 0, and the variable recall_fold may be set to 0.

Next, various steps of the process may be performed for the condition outer_CV_fold<=5 (decision block 406). If the condition returns false (line 408), the results from the outer stratified cross-validation are reported (block 410) and the process ends (block 412).

If the condition (decision block 406) is true (line 414), the input data may be split into two datasets (block 416): train_fold_i and test_fold_i. A percentage of the data (for example, 10%) may be excluded from the train_fold_i dataset for a calibration_data_i dataset (block 418). The random forest may be initialized and the inner_CV_fold variable set to 1 (block 420). Next, a random set of parameters for the random forest may be selected (block 422).

As shown in FIG. 4, various steps of the process may be performed based on the condition inner_CV_fold<=5 (decision block 424). If the condition (decision block 424) is true (line 426), validation data is excluded from the train_fold_i dataset (block 428). The random forest model is then trained with the current parameters and the performance is recorded, while the inner_CV_fold variable is incremented (block 430). Another random set of parameters for the random forest model is then selected (block 422) and the process continues.

If the condition (decision block 424) is false (line 432), the best performing random forest is selected as derived from the train_fold_i dataset and as tested using validation data (block 434). The random forest model is then calibrated using sigmoid calibration (block 436), and the performance of the calibrated model is tested using the test_fold_i dataset (block 438). The model performance may be stored in a precision_fold and recall_fold datasets, while the outer_CV_fold variable is incremented by 1 (block 440).

Figure 5:
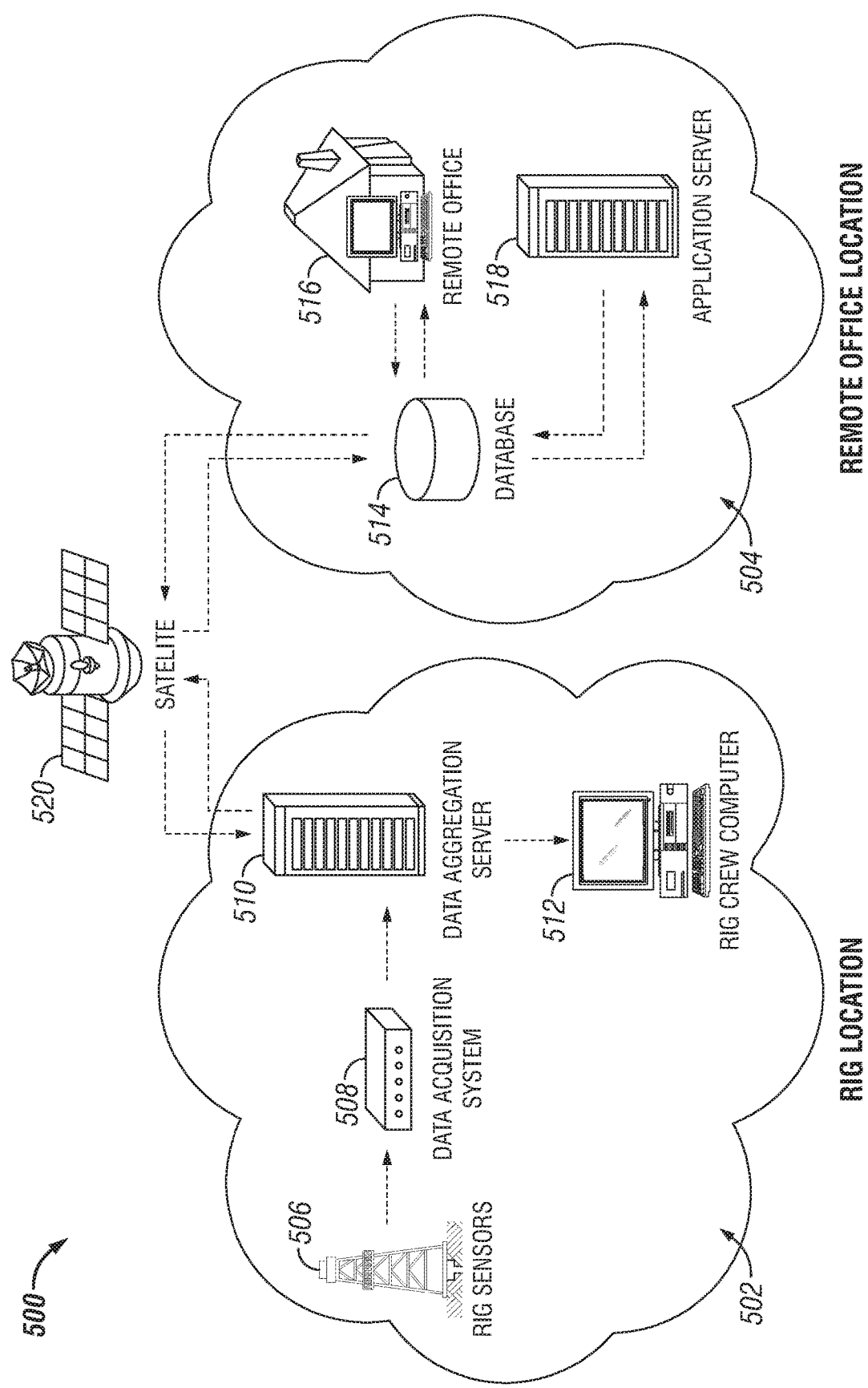
FIG. 5 is a schematic diagram of a system for determining lithology porosity from surface drilling parameters in accordance with an embodiment of the disclosure.

FIG. 5 is a schematic diagram of a system 500 for determining lithology porosity from surface drilling parameters in accordance with an embodiment of the disclosure. The system 500 illustrates components at a drilling rig location 502 and a remote location 504 (that is, a location remote from the drilling rig location 502). As shown in FIG. 5, a drilling rig 506, a data acquisition system 508, a data aggregation server 510, and a rig crew computer 512 may be located at the drilling rig location 502. As also shown in FIG. 5, a database server 514, a remote office 516, and an applications server 518 may be located at the remote location 506.

The drilling rig 506 includes rig sensors for measuring the surface drilling parameters. The data acquisition unit 508 may sample signals from the rig sensors and, in some embodiments, convert sampled analog signals into digital data corresponding to the surface drilling parameters. The surface drilling parameters may be obtained from the data acquisition unit 508 and aggregated in the data aggregation server 510 at the drilling rig location 502. The aggregated surface drilling parameters and drilling fluid parameters data may be transmitted to the remote location 504 via a satellite-based communication network 520. In other embodiments, other networks may be used.

The data aggregation server 510 may be include or be a part of a cloud-computing system, a data center, a server rack or other server enclosure, a virtual server, a desktop computer, a laptop computer, or other suitable computing system or device. The data aggregation server 510 may include a processor and a memory, as well as other components used in operation of the server 510. The processor (as used the disclosure, the term "processor" encompasses microprocessors) may include one or more processors having the capability to receive and process data received from the data acquisition unit 508. In some embodiments, the processor may include an application-specific integrated circuit (AISC). In some embodiments, the processor may include a reduced instruction set (RISC) processor. Additionally, the processor may include single-core processors and multicore processors and may include graphics processors. Multiple processors may be employed to provide for parallel or sequential execution of one or more of the techniques described in the disclosure. The processor may receive instructions and data from a memory of the application server 510.

The memory of the data aggregation server 510 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory may be accessible by the processor of the data aggregation server 510 and may store executable computer code. The executable computer code may include computer program instructions for implementing one or more techniques described in the disclosure. For example, the executable computer code may include instructions for obtaining and storing the surface drilling parameters from the data acquisition system 508.

The rig crew computer 512 may include or be a part of a cloud-computing system, a data center, a server rack or other server enclosure, a server, a virtual server, a desktop computer, a laptop computer, a tablet computer, or the like. The rig crew computer 512 may include a processor and memory similar to those described above with regard to the data aggregation server 510. In some embodiments, the rig crew computer 512 may include a display (for example, a cathode ray tube (CRT) display, liquid crystal display (LCD), an organic light emitting diode (OLED) display)) for displaying a lithology porosity for a well.

The data aggregation server 510 and rig crew computer 512 may each include a network interface (not shown) that may provide for communication between these entities. The network interface may include a wired or wireless network interface. The network interface may communicate with networks, such as the Internet, an intranet, a wide area network (WAN), a local area network (LAN), a metropolitan area network (MAN) or other networks. Communication over such networks may use suitable standards, protocols, and technologies, such as Ethernet Bluetooth, Wireless Fidelity (Wi-Fi) (e.g., IEEE 802.11 standards), and other standards, protocols, and technologies. For example, the data aggregation server 510 may include a network interface for communication over the satellite-based communication network 520.

The aggregated surface drilling parameters and drilling fluid parameters data may be received and stored by the database server 514 at the remote location 504. In some embodiments, the aggregated surface drilling parameters and drilling fluid parameters data may be accessed and reviewed via at the remote office, such as via a computer over a local area network (LAN) at the remote location 504.

The application server 518 may implement the lithology porosity machine learning model described in the disclosure to determine lithology porosity for the well at the drilling rig location 502. The determine lithology porosity data may be received and stored by the database server 514 and transmitted from the database server 514 to the data aggregation server 510 at the drilling rig location 502 via the satellite-based communication network 520. The lithology porosity data may be accessed from the aggregation server 510 by the rig crew computer 512, such as over a local area network (LAN) at the drilling rig location 502.

The application server 518 may include or be a part of a cloud-computing system, a data center, a server rack or other server enclosure, a virtual server, or other suitable computing system or device. The application server 518 may include a processor and a memory, as well as other components used in operation of the server 518. The processor (as used the disclosure, the term "processor" encompasses microprocessors) may include one or more processors having the capability to receive and process data received from the database server 514. In some embodiments, the processor may include an application-specific integrated circuit (AISC). In some embodiments, the processor may include a reduced instruction set (RISC) processor. Additionally, the processor may include single-core processors and multicore processors and may include graphics processors. Multiple processors may be employed to provide for parallel or sequential execution of one or more of the techniques described in the disclosure. The processor may receive instructions and data from a memory of the application server 518.

The memory of the application server 518 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory may be accessible by the processor of the application server 518 and may store executable computer code. The executable computer code may include computer program instructions for implementing one or more techniques described in the disclosure. For example, the executable computer code may include lithology porosity determination instructions to implement one or more embodiments of the present disclosure. In some embodiments, the lithology porosity determination instructions may implement one or more elements of the process 300 described supra and illustrated in FIG. 3. In some embodiments, the lithology porosity determination instructions may receive, as input, data from the database server 514 and provide, as output, a lithology porosity classification that may be stored in the memory of the application server 518. The application server 518 may include a lithology porosity machine learning model for implementation of embodiments of the disclosure. For example, in some embodiments the memory of the application server 518 may include instructions defining a lithology porosity machine learning model executable by the processor of the server 518.

The database server 514 may include or be a part of a cloud-computing system, a data center, a server rack or other server enclosure, a server, a virtual server, a desktop computer, a laptop computer, a tablet computer, or the like. The database server 514 may include a processor and memory similar to those described above with regard to the application server 516. The memory of the database server 514 may include executable computer code (that is, executable by a processor of the database server 514) for storing a database having the surface drilling parameters and lithology porosity classification as described in the disclosure.

The database server 514, remote office 516, and application server 518 may each include a network interface (not shown) that may provide for communication between these entities. The network interface may include a wired or wireless network interface. The network interface may communicate with networks, such as the Internet, an intranet, a wide area network (WAN), a local area network (LAN), a metropolitan area network (MAN) or other networks. Communication over such networks may use suitable standards, protocols, and technologies, such as Ethernet Bluetooth, Wireless Fidelity (Wi-Fi) (e.g., IEEE 802.11 standards), and other standards, protocols, and technologies. For example, the database server 514 may include a network interface for communication over the satellite-based communication network 520.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for determining a lithology porosity of formation rock in a well, comprising:
    obtaining a plurality of surface drilling parameters for a respective plurality of first wells, the plurality of surface drilling parameters comprising a size of a drill bit, fluid flow rate, methane concentration in a drilling fluid, ethane concentration in the drilling fluid, total gas concentration in the drilling fluid, weight of the drilling fluid flowing into the well, weight of the drilling fluid flowing out of the well, rate of penetration of the drill bit, rotation speed of the drill bit, a torque between the drill string and a formation, weight on bit (WOB), temperature of the drilling fluid flowing into the well, and temperature of the drilling fluid flowing out of the well;

obtaining a respective plurality of wireline logs for the plurality of first wells, wherein obtaining a respective plurality of wireline logs for the plurality of first wells comprises:
inserting a wireline tool into a respective well; and
generating a wireline log from a measurement signal obtained using the wireline tool;

determining respective lithology porosity classifications for the plurality of first wells based on the wireline logs to produce a structured data set comprising the plurality of surface drilling parameters, and the lithology porosity classifications, the lithology porosity classifications comprising a lithology porosity at one or more depths for each of the plurality of first wells;

generating a lithology porosity machine learning model using the structured data set wherein generating a lithology porosity machine learning model using the structured data set comprises using nested stratified cross-validation comprising an inner five-fold cross-validation performed on training data from the structured data set and an outer five-fold cross-validation used to validate the lithology porosity machine learning model;

calibrating the lithology porosity machine learning model using a machine learning sigmoid calibration, the calibrating comprising converting predicted class values by the lithology porosity machine leaning model into probabilities of a sample belonging to a lithology porosity selected from the group consisting of tight sand, shaly sand, porous gas, and porous wet;

obtaining a second plurality of surface drilling parameters from a second well; and determining, using the second plurality of surface drilling parameters and the lithology porosity machine learning model, a lithology porosity classification for the second well, the lithology porosity classification for the second well comprising a lithology porosity at one or more depths for the second well, wherein the lithology porosity is selected from the group consisting of tight sand, shaly sand, porous gas, and porous wet.

2. The method of claim 1, wherein each of the plurality of wireline logs comprises at least one of a neutron porosity (NPHI) log, a sonic (DT) log, a density (RHOB) log, and a gamma ray (GR) log.

3. The method of claim 1, comprising normalizing the plurality of surface drilling parameters before generating the lithology porosity machine learning model.

4. The method of claim 3, wherein normalizing the plurality of surface drilling parameters comprises using z-score normalization.

5. The method of claim 1, wherein the lithology porosity machine learning model comprises a random forest, an artificial neural network (ANN), a support vector machine (SVM), or long-short term memory networks.

6. The method of claim 1, comprising normalizing the second plurality of surface drilling parameters.

7. The method of claim 1, wherein the structured data set comprises a database.

8. A system for determining the lithology porosity of formation rock in a well, comprising:
a plurality of wireline logs for a respective plurality of first wells, the plurality of wireline logs obtained by inserting a wireline tool into a respective well and generating a wireline log from a measurement signal obtained using the wireline tool;
a non-transitory computer-readable medium, the medium having executable code stored thereon, the executable code comprising a set of instructions that causes a processor to perform operations comprising:
obtaining a plurality of surface drilling parameters for a respective plurality of first wells, the plurality of surface drilling parameters comprising drill bit size, fluid flow rate, methane concentration in a drilling fluid, ethane concentration in the drilling fluid, total gas concentration in the drilling fluid, weight of the drilling fluid flowing into the well, weight of the drilling fluid flowing out of the well, rate of penetration of the drill bit, rotation speed of the drill bit, the torque between the drill string and a formation, weight on bit (WOB), temperature of the drilling fluid flowing into the well, and temperature of the drilling fluid flowing out of the well;
determining respective lithology porosity classifications for the plurality of first wells based on the wireline logs to produce a structured data set comprising the plurality of surface drilling parameters, and the lithology porosity classifications, the lithology porosity classifications comprising a lithology porosity at one or more depths for each of the plurality of first wells;
generating a lithology porosity machine learning model using the structured data set, wherein generating a lithology porosity machine learning model using the structured data set comprises using nested stratified cross-validation comprising an inner five-fold cross-validation performed on training data from the structured data set and an outer five-fold cross-validation used to validate the lithology porosity machine learning model;
calibrating the lithology porosity machine learning model using a machine learning sigmoid calibration, the calibrating comprising converting predicted class values by the lithology porosity machine leaning model into probabilities of a sample belonging to a lithology porosity selected from the group consisting of tight sand, shaly sand, porous gas, and porous wet;
obtaining a second plurality of surface drilling parameters from a second well; and
determining, using the second plurality of surface drilling parameters and the lithology porosity machine learning model, a lithology porosity classification for the second well, the lithology porosity classification for the second well comprising a lithology porosity at one or more depths for the second well, wherein the lithology porosity is selected from the group consisting of tight sand, shaly sand, porous gas, and porous wet.

9. The system of claim 8, wherein each of the plurality of wireline logs comprises at least one of a neutron porosity (NPHI) log, a sonic (DT) log, a density (RHOB) log, a gamma ray (GR) log.

10. The system of claim 8, the operations comprising normalizing the plurality of surface drilling parameters before generating the lithology porosity machine learning model.

11. The system of claim 8, wherein the lithology porosity machine learning model comprises a random forest, an artificial neural network (ANN), a support vector machine (SVM), or long-short term memory networks.

12. The system of claim 8, the operations comprising normalizing the second plurality of surface drilling parameters.

13. The system of claim 8, comprising a wireline tool operable to generate the second wireline log.

14. The system of claim 8, wherein the structured data set comprises a database.

15. A non-transitory computer-readable medium, the medium having executable code stored thereon for determining the lithology porosity of formation rock in a well, the executable code comprising a set of instructions that causes a processor to perform operations comprising:
   obtaining a plurality of surface drilling parameters for a respective plurality of first wells, the plurality of surface drilling parameters comprising drill bit size, fluid flow rate, methane concentration in a drilling fluid, ethane concentration in the drilling fluid, total gas concentration in the drilling fluid, weight of the drilling fluid flowing into the well, weight of the drilling fluid flowing out of the well, rate of penetration of the drill bit, rotation speed of the drill bit, the torque between the drill string and a formation, weight on bit (WOB), temperature of the drilling fluid flowing into the well, and temperature of the drilling fluid flowing out of the well;
   obtaining a respective plurality of wireline logs for the plurality of first wells, wherein obtaining a respective plurality of wireline logs for the plurality of first wells comprises:
      inserting a wireline tool into a respective well; and
      generating a wireline log from a measurement signal obtained using the wireline tool;
   determining respective lithology porosity classifications for the plurality of first wells based on the wireline logs to produce a structured data set comprising the plurality of surface drilling parameters, and the lithology porosity classifications, the lithology porosity classifications comprising a lithology porosity at one or more depths for each of the plurality of first wells;
   generating a lithology porosity machine learning model using the structured data set wherein generating a lithology porosity machine learning model using the structured data set comprises using nested stratified cross-validation comprising an inner five-fold cross-validation performed on training data from the structured data set and an outer five-fold cross-validation used to validate the lithology porosity machine learning model;
   calibrating the lithology porosity machine learning model using a machine learning sigmoid calibration, the calibrating comprising converting predicted class values by the lithology porosity machine leaning model into probabilities of a sample belonging to a lithology porosity selected from the group consisting of tight sand, shaly sand, porous gas, and porous wet;
   obtaining a second plurality of surface drilling parameters from a second well; and
   determining, using the second plurality of surface drilling parameters and the lithology porosity machine learning model, a lithology porosity classification for the second well, the lithology porosity classification for the second well comprising a lithology porosity at one or more depths for the second well, wherein the lithology porosity is selected from the group consisting of tight sand, shaly sand, porous gas, and porous wet.

16. The non-transitory computer-readable medium of claim 15, wherein each of the plurality of wireline logs comprises at least one of a neutron porosity (NPHI) log, a sonic (DT) log, a density (RHOB) log, a gamma ray (GR) log.

17. The non-transitory computer-readable medium of claim 15, the operations comprising normalizing the plurality of surface drilling parameters before generating the lithology porosity machine learning model.

18. The non-transitory computer-readable medium of claim 15, wherein the lithology porosity machine learning model comprises a random forest, an artificial neural network (ANN), a support vector machine (SVM), or long-short term memory networks.

19. The non-transitory computer-readable medium of claim 15, the operations comprising normalizing the second plurality of surface drilling parameters.

* * * * *